United States Patent
Dörner et al.

(10) Patent No.: US 8,880,313 B2
(45) Date of Patent: Nov. 4, 2014

(54) METHOD AND DEVICE FOR OPERATING A VEHICLE, IN PARTICULAR A MOTOR VEHICLE OR UTILITY VEHICLE

(75) Inventors: Karlheinz Dörner, Karlsfeld (DE); Andreas Zimmermann, München (DE); Daniel Heyes, München (DE); Martin Huber, München (DE); Peter Drimml, Dachau (DE); Britta Michel, München (DE)

(73) Assignee: MAN Truck & Bus AG, Munich (DE)

( * ) Notice: Subject to any disclaimer, the term of this patent is extended or adjusted under 35 U.S.C. 154(b) by 243 days.

(21) Appl. No.: 13/272,411

(22) Filed: Oct. 13, 2011

(65) Prior Publication Data

US 2012/0095645 A1  Apr. 19, 2012

(30) Foreign Application Priority Data

Oct. 13, 2010 (DE) .......................... 10 2010 048 326

(51) Int. Cl.
| | | |
|---|---|---|
| B60T 8/00 | (2006.01) | |
| B60W 10/06 | (2006.01) | |
| B60W 10/30 | (2006.01) | |
| B60W 10/184 | (2012.01) | |
| B60W 30/186 | (2012.01) | |
| B60W 50/00 | (2006.01) | |
| B60W 30/18 | (2012.01) | |
| B60W 10/196 | (2012.01) | |
| B60W 10/18 | (2012.01) | |

(52) U.S. Cl.
CPC ............ B60W 10/184 (2013.01); B60W 10/06 (2013.01); B60W 10/30 (2013.01); B60W 2710/0666 (2013.01); B60W 2550/402 (2013.01); B60W 2550/148 (2013.01); B60W 2710/1005 (2013.01); Y02T 10/84 (2013.01); B60W 10/196 (2013.01); B60W 30/186 (2013.01); B60W 2550/143 (2013.01); B60W 50/0097 (2013.01); B60W 10/18 (2013.01); B60W 30/18136 (2013.01)

USPC .................. 701/70; 701/23; 701/25; 701/36; 701/48; 701/54; 701/58; 701/408; 340/988

(58) Field of Classification Search
USPC ...................... 701/36, 48, 123, 408; 340/988
See application file for complete search history.

(56) References Cited

U.S. PATENT DOCUMENTS

| | | | | |
|---|---|---|---|---|
| 5,504,482 A | * | 4/1996 | Schreder | 340/995.13 |
| 5,668,529 A | * | 9/1997 | Kyrtsos | 340/454 |
| 6,370,472 B1 | * | 4/2002 | Fosseen | 701/102 |

(Continued)

FOREIGN PATENT DOCUMENTS

| | | |
|---|---|---|
| DE | 101 01 012 A1 | 7/2002 |
| DE | 10 2008 036 457 A1 | 5/2009 |
| DE | 10 2008 040 284 A1 | 1/2010 |

*Primary Examiner* — Thomas Tarcza
*Assistant Examiner* — Tyler J Lee
(74) *Attorney, Agent, or Firm* — Laurence A. Greenberg; Werner H. Stemer; Ralph E. Locher

(57) ABSTRACT

A method operates a vehicle having an acquisition device for acquiring defined route section data of an upcoming route section to be passed through via the vehicle, in particular a utility vehicle. Accordingly, the route section data, which are acquired by the acquisition device are evaluated in an evaluation device with respect to the wear reduction potential of a vehicle-side wearing part for the upcoming route section to be passed through such that, to reduce and/or optimize the wear of the wearing part. An actuating parameter, in particular an actuating time and/or an actuating duration, is predetermined for the wearing part in the upcoming route section to be passed through. An auxiliary device which supports the wearing part in its action is activated in the upcoming route section to be passed through in accordance with at least one predefined auxiliary device parameter.

18 Claims, 1 Drawing Sheet

(56) References Cited

U.S. PATENT DOCUMENTS

| | | | |
|---|---|---|---|
| 6,487,477 B1* | 11/2002 | Woestman et al. | 701/22 |
| 6,990,401 B2* | 1/2006 | Neiss et al. | 701/96 |
| 7,424,868 B2* | 9/2008 | Reckels et al. | 123/41.1 |
| 7,437,232 B2* | 10/2008 | Tengler et al. | 701/96 |
| 7,925,426 B2* | 4/2011 | Koebler et al. | 701/123 |
| 8,620,557 B2* | 12/2013 | Johansson et al. | 701/93 |
| 2003/0065432 A1* | 4/2003 | Shuman et al. | 701/48 |
| 2011/0106388 A1* | 5/2011 | Boeckenhoff et al. | 701/70 |

* cited by examiner

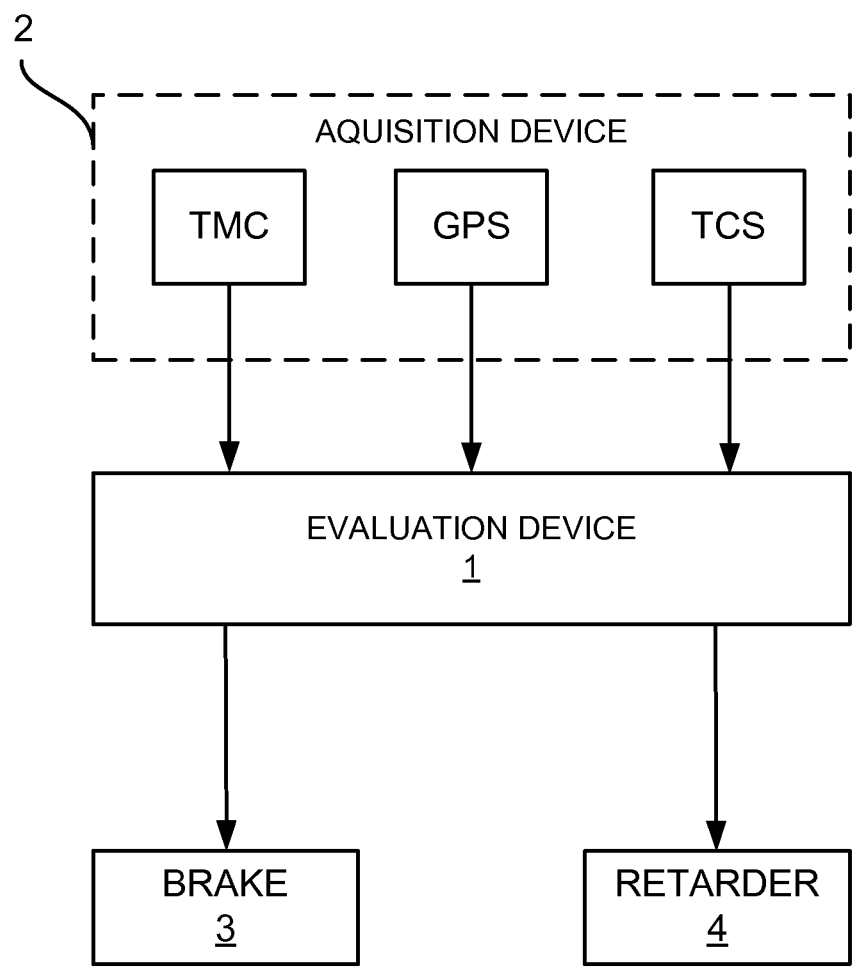

METHOD AND DEVICE FOR OPERATING A VEHICLE, IN PARTICULAR A MOTOR VEHICLE OR UTILITY VEHICLE

CROSS-REFERENCE TO RELATED APPLICATION

This application claims the priority, under 35 U.S.C. §119, of German application DE 10 2010 048 326.5, filed Oct. 13, 2010; the prior application is herewith incorporated by reference in its entirety.

BACKGROUND OF THE INVENTION

Field of the Invention

The invention relates to a method for operating a vehicle, in particular a motor vehicle or utility vehicle, and a device for operating a vehicle, in particular a motor vehicle or utility vehicle.

Such methods and devices for operating a vehicle are generally known, thus, for example, from published, non-prosecuted German patent application DE 10 2008 036 457 A1. A method and a device for operating a motor vehicle are proposed therein, by which a power consumption of the motor vehicle is to be reduced. For this purpose, it is provided that a battery of the motor vehicle is regulated or controlled as a function of properties of an expected travel route, expected traffic conditions, and/or expected environmental conditions. Concretely, for this purpose the device contains a navigation system, a receiving unit for receiving data of a current traffic situation, a second receiving unit for receiving data of a weather prediction, and a charge regulator, to which signals of the navigation system and the two receiving units can be supplied. The charge of the battery is regulated by a generator by the charge regulator in dependence on these signals.

Furthermore, a method and an apparatus for the navigated guiding of motor vehicles are known from published, non-prosecuted German patent application DE 101 01 012 A1, by which the navigated guiding of motor vehicles is to be improved such that ascents and descents are also optimally taken into consideration. Concretely, it is proposed for this purpose that the location data be used in driving operation for determining a height profile and the instantaneous engine output and/or the transmission gear setting be predictively regulated accordingly to an ascent or descent to be expected.

Furthermore, a method for acquiring predetermined data during the operation of a vehicle is known from published, non-prosecuted German patent application DE 10 2008 040 284 A1, in which a personal mode of driving of the respective driver is analyzed and ascertained in various driving situations. It is thus to be possible to train the driver accordingly and inform him of specific misbehavior through the evaluation of the driving style of the driver. For example, the data stored on the driver card or a chip card and the stored settings in the transmission controller can also be automatically activated to adapt the driving strategy when the relevant driver logs on in the vehicle.

A further essential problem in motor vehicles, in particular utility vehicles (large trucks), is the wear of wearing parts, for example, the service brakes. Depending on the wear status of such a wearing part, it must be maintained or replaced, which results in vehicle shutdown and/or repair costs.

SUMMARY OF THE INVENTION

It is accordingly an object of the invention to provide a method and a device for operating a vehicle, in particular a motor vehicle or utility vehicle which overcome the above-mentioned disadvantages of the prior art methods and devices of this general type, in which the wear of wearing parts can be reduced.

Accordingly, a method is proposed for operating a vehicle, in particular a motor vehicle or utility vehicle, which contains an acquisition device for acquiring defined route section data of an upcoming route section, which is to be passed through via the vehicle, in particular a utility vehicle. According to the invention, the route section data acquired by the acquisition device of the upcoming route section to be passed through is evaluated in an evaluation device with respect to the wear reduction potential of at least one vehicle-side wearing part for the upcoming route section to be passed through in such a way that at least one actuation parameter, in particular an actuating time and/or an actuating duration, is predetermined for the at least one wearing part in the upcoming route section to be passed through to reduce and/or optimize the wear of the at least one wearing part. Furthermore, at least one auxiliary device, which supports the at least one wearing part in its action, is activated in the upcoming route section to be passed through in accordance with at least one predefined auxiliary device parameter.

Using such a method control according to the invention, the wearing part can thus be supported in defined operating states by an auxiliary device such that the respective wearing part is relieved, which advantageously contributes to lengthening the service life of the wearing part and therefore reducing its wear. A relief can be understood both as taking over a part of the work to be performed by the respective wearing part, so that the wearing part no longer has to perform all of the work and correspondingly a relief occurs with respect to the load of the wearing part. Alternatively or additionally, however, a relief can also be performed such that the actuating time of the wearing part can be reduced by the activation of the auxiliary device, which also substantially contributes to lengthening the service life of the wearing part.

Through the evaluation of the wear reduction potential with respect to the upcoming route section to be passed through, an actuating time and an actuating duration for the respective wearing part in the upcoming route section to be passed through may be ascertained in a simple way, and the deactivation of the auxiliary device for a predetermined duration can then also be determined in accordance with the activation or also of course after completed activation.

According to a particularly preferred concrete embodiment, it is proposed that the topography data and/or a current traffic situation and/or regulations and/or equipment which influence the traffic flow and/or the roadway composition and/or the road conditions be acquired by the acquisition device as the route section data of the upcoming route section to be passed through, and be supplied to the evaluation device for evaluating and/or optimizing the wear reduction potential of the at least one wearing part. Such a data acquisition can be performed in a simple way by the devices regularly already provided in any case. For example, the topography data of the upcoming route section to be passed through can be acquired by the navigation system. The topography data are also to contain the height profile data of the upcoming route section, i.e., the ascents or descents in the area of the upcoming route section to be passed through, in addition to solely the course of the road. The regulations or equipment which influence the traffic flow, for example, traffic signs of all types, in particular speed-restricting specifications, place-name signs, give way signs, stop signs, pedestrian crossings, traffic lights, etc., can also be stored as data in the navigation system, for example, or can also be a component of a separate system, which then delivers the data in a corresponding way to the acquisition device or itself forms a component of the acquisition device. The roadway composition can be ascertained in connection with the data of typical brake and suspension systems or tapped therefrom, for example. Such brake and suspension systems can be the ABS (antilock braking system), TCS (traction control system), EBC (electronic brake control), and/or a VDC (vehicle dynamics controller). This is also fundamentally true for the road conditions, data from a weather station or the like also optionally being able to be provided here. The current traffic situation itself can be determined, for example, in connection with TMC messages (traffic message channel). The more data that can be acquired by the acquisition device for the upcoming route section to be passed through, the more precisely can the wear reduction potential be determined in this route section and therefore can the operation and the actuation of both the respective wearing part and also the at least one auxiliary device be determined.

According to a further particularly preferred concrete embodiment, it is proposed that the at least one actuating parameter for the at least one wearing part and/or the at least one auxiliary device parameter for wear reduction or wear optimization of the at least one wearing part be ascertained and/or predefined on the basis of an optimum mode of driving for the upcoming route section to be passed through. This driving parameter which defines the optimum mode of driving can be stored in the evaluation device, for example, and then retrieved accordingly therefrom. Alternatively, the driving parameter which defines the optimum mode of driving can also be always currently ascertained on the basis of the route section data of the upcoming route section to be passed through which are acquired by the acquisition device. Using such a method control, it is ensured that the wear reduction potential is utilized optimally, because an optimum mode of driving for the route section to be passed through can then be used as a reference variable. This optimum mode of driving can be based on consumption parameters, for example, such as an energy consumption of a vehicle, in particular a fuel consumption. Using such a control method according to the invention, which is based on both the wear reduction potential and also an optimum mode of driving with respect to fuel savings potential, for example, in addition to a mode of operation optimized with respect to the wear, a vehicle mode of operation which is also optimized with respect to other parameters, in particular energy consumption parameters, may also be achieved. The optimum mode of driving can either be specified and/or displayed to the driver as an optional desired mode of driving, or also alternatively predefined for the driver by an automatic system intervention.

According to a particularly preferred concrete embodiment, the wearing part is formed by at least one vehicle-side wearing brake, for example, a service brake and/or a retarder, the wear of which is reduced as a function of a brake deceleration ascertained for the upcoming route section to be passed through in that, in the upcoming route section to be passed through, at least one secondary assembly which causes vehicle deceleration is at least temporarily activated and/or turned on as an auxiliary device. Alternatively or additionally, its wear can also be reduced as a function of a brake deceleration ascertained for the upcoming route section to be passed through in that the drag torque of the vehicle drive engine, such as an internal combustion engine, is at least temporarily increased, which is achieved in particular by engaging a lower gear step, for example. Using such a control method, the braking torque required for the respective desired vehicle deceleration in the upcoming route section to be passed through must only still be partially applied by a wearing brake itself, so that this brake is thus protected and its service life is lengthened.

Concretely, the at least one secondary assembly can be formed here, for example, by an air compressor or fan of an air conditioner and/or a chargeable energy store, such as a vehicle battery, which is coupled to the drivetrain of the vehicle so that if it is switched in, a part of the existing vehicle drive energy is used to actuate the respective secondary assembly and a corresponding vehicle deceleration is thus achieved.

According to a further particularly preferred control method, the at least one secondary assembly can alternatively or additionally also be formed by a wear-free vehicle-side brake device, for example, a retarder (brake machine) which can be implemented, for example, as a hydrodynamic retarder or as an electrodynamic retarder. Alternatively, an engine brake device can be used as the wear-free vehicle-side brake device, in which the brake action is generated, for example, by throttling the exhaust gas flow through a flap or the like situated in the exhaust manifold, for example. The above statements also apply for these secondary assemblies.

The evaluation of the wear reduction potential for a defined upcoming route section to be passed through can fundamentally be started automatically by the system, for example, in dependence on the data, which is acquired by the acquisition device, of an upcoming route section to be passed through. Alternatively or additionally thereto, the evaluation of the wear reduction potential and therefore optionally the activation of the at least one auxiliary device can also be started when the driver signals a deceleration intent, for example, by actuating the wearing brake.

In order to ensure that the auxiliary device is only activated for the case in which a sufficiently large wear reduction can also be achieved, it is provided according to a further particularly preferred embodiment that the at least one auxiliary device is only activated for the case in which, upon the evaluation of an upcoming route section to be passed through, a wear reduction potential is ascertained which has reached or exceeded a predefined threshold value.

The device according to the invention has the same advantages as have already been extensively explained above in connection with the method control.

Other features which are considered as characteristic for the invention are set forth in the appended claims.

Although the invention is illustrated and described herein as embodied in a method and a device for operating a vehicle, in particular a motor vehicle or utility vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWING

The single FIGURE of the drawing is a block diagram for operating a vehicle according to the invention.

DETAILED DESCRIPTION OF THE INVENTION

Referring now to the single FIGURE of the drawing in detail, there is shown a device according to the invention for performing a method according to the invention in extremely schematic and exemplary form, in which an evaluation device 1 is supplied, by an acquisition device 2, with route section data for an upcoming route section to be passed through. The acquisition device 2 acquires data in the present case of a navigation system referred to as a GPS, a TMC (TMC=traffic message channel), and a traction control system referred to here as a TCS. On the basis of these data, for example, in the event of an actuation of a wearing brake 3 acquired by the evaluation unit 1, a required brake deceleration is ascertained for the upcoming route section to be passed through, the end of which can be formed, for example, by the destination input by the navigation device or also by any other predefined defined distance route. The required brake deceleration can then be evaluated or weighted, for example, in such a way that it is checked whether or not a desired wear reduction of the wearing brake 3 can be achieved by switching in a retarder 4, for example, as a secondary assembly. If this is the case, both the wearing brake 3 and also the retarder 4 are activated by the evaluation device 1 and the desired vehicle deceleration is set via them. By switching in the retarder 4, the operating time or the actuating force of the wearing brake 3 can advantageously be reduced, which has a positive effect on their wear.

The control method described concretely in the present case is solely exemplary. Of course, instead of a retarder, an engine brake can also be activated, optionally instead of the retarder or also additionally to the retarder. The above-described example is to be understood as solely exemplary and is to cause no restriction of the complete content of the disclosure of the idea of the present invention. According to the idea of the present invention, additional deceleration possibilities can therefore be used in a known upcoming route section. Concretely, for example, longer descent routes, the approaches to an intersection, etc., can be recognized via a topology stored in the maps of the navigation system and the additional deceleration possibilities can thus be activated as needed, when the driver or alternatively also an automatic system signals a deceleration intent.

The invention claimed is:

1. A method for operating a vehicle having an acquisition device for acquiring defined route section data of an upcoming route section to be passed through by the vehicle, which comprises the steps of:
  evaluating the defined route section data acquired by the acquisition device, of the upcoming route section to be passed through, in an evaluation device with respect to a wear reduction potential of at least one vehicle-side wearing brake for the upcoming route section to be passed through;
  predetermining at least one actuating parameter for the at least one vehicle-side wearing brake in the upcoming route section to be passed through to reduce or optimize wear of the at least one vehicle-side wearing brake; and
  with the evaluation device, activating at least one auxiliary device, which supports the at least one vehicle-side wearing brake in its action, in the upcoming route section to be passed through in accordance with at least one predefined auxiliary device parameter.

2. The method according to claim 1, which further comprises:
  acquiring at least one of topography data, current traffic situation data, regulation data, data on equipment which influences traffic flow, roadway composition data or road condition data by means of the acquisition device as the defined route section data of the upcoming route section to be passed through; and
  supplying the data to the evaluation device to optimize the wear reduction potential of the at least one vehicle-side wearing brake.

3. The method according to claim 1, wherein for the wear reduction potential or wear optimization of the at least one vehicle-side wearing brake, performing the further steps of:
  ascertaining driving parameters including the at least one actuating parameter for the at least one vehicle-side wearing brake and the at least one predefined auxiliary device parameter on a basis of an optimum mode of driving for the upcoming route section to be passed through;
  storing the driving parameters which define the optimum mode of driving in the evaluation device; and
  retrieving or ascertaining the driving parameters on a basis of the defined route section data, which are acquired by means of the acquisition device, of the upcoming route section to be passed through.

4. The method according to claim 3, which further comprises performing at least one of:
  predefining the optimum mode of driving to a driver as an optional desired mode of driving;
  displaying the optimum mode of the driving to the driver as the optional desired mode of driving; or
  predefining the optimum mode for the driver by an automatic system intervention.

5. The method according to claim 1, which further comprises:
  reducing a wear of the vehicle-side wearing brake in dependence on a brake deceleration ascertained for the upcoming route section to be passed through in that, in the upcoming route section to be passed through, at least one secondary assembly which causes vehicle deceleration is at least temporarily activated as the auxiliary device to increase a drag torque of a vehicle drive engine.

6. The method according to claim 5, which further comprises selecting the at least one secondary assembly from the group consisting of an air compressor, a fan of an air conditioner, and a chargeable energy store coupled to a drivetrain of the vehicle such that, when the secondary assembly is switched in, a part of an existing vehicle drive energy is used to actuate the secondary assembly and a vehicle deceleration is thus achieved.

7. The method according to claim 5, which further comprises selecting the secondary assembly from the group consisting of a wear-free vehicle-side brake device, a retarder and an engine brake device.

8. The method according to claim 5, which further comprises starting automatically an evaluation of the wear reduction potential for a defined upcoming route section to be passed through.

9. The method according to claim 1, which further comprises activating the at least one predefined auxiliary device for a case in which the wear reduction potential, which has reached or exceeded a predefined threshold value, is ascertained during the evaluation of an upcoming route section to be passed through.

10. The method according to claim 1, which further comprises selecting the at least one actuating parameter from the group consisting of an actuating time and an actuating duration.

11. The method according to claim 5, which further comprises:
  selecting the at least one vehicle-side wearing brake from the group consisting of a main brake and a retarder; and
  increasing the drag torque by engaging a lower gear step.

12. The method according to claim 5, which further comprises starting an evaluation of the wear reduction potential for a defined upcoming route section to be passed through automatically, in dependence on the data, acquired by the acquisition device, of the upcoming route section to be passed through.

13. The method according to claim 5, which further comprises starting an evaluation of the wear reduction potential for a defined upcoming route section to be passed through when a driver signals a deceleration intent.

14. A device for operating a vehicle, the device comprising:
an acquisition device for acquiring defined route section data of an upcoming route section to be passed through; and
an evaluation device, by means of which a wear reduction potential of at least one vehicle-side wearing brake is evaluated in dependence on the defined route section data acquired.

15. A device for operating a vehicle, the device comprising:
an acquisition device;
an evaluation device; and
the device programmed to:
evaluate a defined route section data acquired by said acquisition device, of an upcoming route section to be passed through, in said evaluation device with respect to a wear reduction potential of at least one vehicle-side wearing brake for the upcoming route section to be passed through;
predetermine at least one actuating parameter for the at least one vehicle-side wearing brake in the upcoming route section to be passed through to reduce or optimize wear of the at least one vehicle-side wearing brake; and
activating at least one auxiliary device, which supports the at least one vehicle-side wearing brake in its action, in the upcoming route section to be passed through in accordance with at least one predefined auxiliary device parameter.

16. The method according to claim 1, wherein the auxiliary device that is activated by the evaluation device is selected from the group consisting of a wear-free vehicle-side brake device and a retarder.

17. The device according to claim 14, wherein the evaluation device is configured to activate an auxiliary device which supports the at least one vehicle-side wearing brake in its action, in the upcoming route section to be passed through in accordance with at least one predefined auxiliary device parameter; and the auxiliary device is selected from the group consisting of a wear-free vehicle-side brake device and a retarder.

18. The device according to claim 15, wherein the auxiliary device is selected from the group consisting of a wear-free vehicle-side brake device and a retarder.

* * * * *